US00RE50894E

(19) United States
(12) Reissued Patent
Gabay

(10) Patent Number: US RE50,894 E
(45) Date of Reissued Patent: May 19, 2026

(54) POSITIONING SYSTEM BASED ON DISTRIBUTED TRANSMISSION AND RECEPTION OF WI-FI SIGNALS

(71) Applicant: CELENO COMMUNICATIONS (ISRAEL) LTD., Raanana (IL)

(72) Inventor: Moti Gabay, Kfar Saba (IL)

(73) Assignee: RENESAS SEMICONDUCTOR DESIGN ISRAEL LTD., Raanana (IL)

(21) Appl. No.: 17/967,938

(22) Filed: Oct. 18, 2022

Related U.S. Patent Documents

Reissue of:
(64) Patent No.: 11,102,750
Issued: Aug. 24, 2021
Appl. No.: 16/726,853
Filed: Dec. 25, 2019

U.S. Applications:
(60) Provisional application No. 62/787,310, filed on Jan. 1, 2019.

(51) Int. Cl.
*G01S 13/00* (2006.01)
*G01S 5/14* (2006.01)
(Continued)

(52) U.S. Cl.
CPC ..... *G01S 13/003* (2013.01); *G01S 5/14* (2013.01); *G01S 13/876* (2013.01);
(Continued)

(58) Field of Classification Search
CPC ..... G01S 13/003; G01S 5/14; G01S 13/876; G01S 5/0221; H04W 64/003; H04W 64/00; H04W 84/12
See application file for complete search history.

(56) References Cited

U.S. PATENT DOCUMENTS 7,054,296 B1 * 5/2006 Sorrells ..... H04B 1/406 370/338
7,072,390 B1 * 7/2006 Sorrells ..... H04L 25/061 375/222
(Continued)

FOREIGN PATENT DOCUMENTS

CN 103308934 A 9/2013
EP 2696332 A1 2/2014
(Continued)

OTHER PUBLICATIONS

Yildirim et al., "Enabling MIMO Radars in WLAN Sensing: From Spatial Multiplexing to Beamsteering", Proceedings of the 21st European Radar Conference, 2024 pp. 67-70 (Year: 2024).*
(Continued)

*Primary Examiner* — Charles R Craver
(74) *Attorney, Agent, or Firm* — Meitar Patents LTD.; Daniel Kligler

(57) ABSTRACT

A method for estimating a location of a target Wireless Local-Area Network (WLAN) device includes obtaining relative locations of three or more WLAN devices. Respective distances are measured between each of the WLAN devices and the target WLAN device. The location of the target WLAN device is estimated based on the locations of the WLAN devices and on the measured distances, wherein measuring a distance between a WLAN device and the target WLAN device includes: exchanging WLAN signals, detecting a first leakage signal by a receiver of the WLAN device, detecting a second leakage signal by the receiver of the target WLAN device, calculating time differences between a time a WLAN signal was sent and a time a leakage signal was detected, and subtracting the time differences one from the other to obtain a time-of-flight that corresponds to the distance between the WLAN device and the target WLAN device.

10 Claims, 4 Drawing Sheets

(51) Int. Cl.
*G01S 13/87* (2006.01)
*H04W 64/00* (2009.01)
*H04W 84/12* (2009.01)

(52) U.S. Cl.
CPC ..... *H04W 64/00* (2013.01); *H04W 64/003* (2013.01); *H04W 84/12* (2013.01)

(56) References Cited

U.S. PATENT DOCUMENTS

| | | | | |
|---|---|---|---|---|
| 8,737,279 | B1 | 5/2014 | Aweya et al. | |
| 8,897,152 | B1 * | 11/2014 | Caceres | H04W 52/0229 370/252 |
| 9,474,041 | B1 | 10/2016 | Zhang et al. | |
| 9,686,164 | B1 * | 6/2017 | Paczkowski | H04L 43/08 |
| 9,971,414 | B2 | 5/2018 | Gollakota et al. | |
| 10,031,209 | B2 | 7/2018 | Sen et al. | G01S 5/14 |
| 11,057,862 | B2 | 7/2021 | Scharf et al. | |
| 11,102,750 | B2 | 8/2021 | Gabay | |
| 11,105,912 | B2 | 8/2021 | Yokev et al. | |
| 12,058,585 | B2 * | 8/2024 | Raj | H04W 4/80 |
| 2006/0109780 | A1 | 5/2006 | Fechtel | |
| 2009/0022157 | A1 | 1/2009 | Rumbaugh et al. | |
| 2010/0130873 | A1 | 5/2010 | Yuen et al. | |
| 2011/0287778 | A1 | 11/2011 | Levin et al. | |
| 2014/0187259 | A1 | 7/2014 | Kakani et al. | |
| 2015/0270867 | A1 | 9/2015 | Young et al. | |
| 2016/0044695 | A1 * | 2/2016 | Gunner | H04L 49/205 370/336 |
| 2016/0259041 | A1 | 9/2016 | Tan et al. | |
| 2017/0034507 | A1 | 2/2017 | Harris et al. | |
| 2017/0086202 | A1 | 3/2017 | Chen | H04W 72/541 |
| 2017/0188227 | A1 * | 6/2017 | Kang | G01S 5/0252 |
| 2017/0212210 | A1 | 7/2017 | Chen et al. | G01S 5/06 |
| 2017/0295550 | A1 | 10/2017 | Amizur | |
| 2018/0081030 | A1 | 3/2018 | McMahon et al. | |
| 2018/0115439 | A1 | 4/2018 | Bhatti et al. | |
| 2018/0121226 | A1 * | 5/2018 | Liu | G06F 9/45558 |
| 2018/0249437 | A1 * | 8/2018 | Lindskog | G01S 13/878 |
| 2019/0120952 | A1 | 4/2019 | Kim | |
| 2020/0229126 | A1 * | 7/2020 | Soriaga | H04J 3/0682 |
| 2020/0271753 | A1 * | 8/2020 | Va | G01S 7/038 |
| 2020/0278438 | A1 * | 9/2020 | Huang | G01S 7/038 |
| 2020/0319294 | A1 * | 10/2020 | Va | H01Q 1/525 |
| 2020/0333472 | A1 * | 10/2020 | Marshall | G01S 19/44 |
| 2021/0190702 | A1 * | 6/2021 | Wu | G01S 7/411 |
| 2023/0100595 | A1 * | 3/2023 | Hur | H04B 1/006 455/552.1 |
| 2024/0340123 | A1 * | 10/2024 | Duan | H04L 5/0007 |
| 2024/0380540 | A1 * | 11/2024 | Duan | H04L 5/0048 |

FOREIGN PATENT DOCUMENTS

| | | | |
|---|---|---|---|
| WO | 2016065368 | A1 | 4/2016 |
| WO | 2018222268 | A1 | 12/2018 |

OTHER PUBLICATIONS

Weiß, "Passive WLAN Radar Network using Compressed Sensing", IET International Conference on Radar Systems (Radar 2012), pp. 1-6 (Year: 2012).*
EP Application # 19907054.1 Search Report dated Aug. 25, 2022.
Qifan Pu et al., "Whole-Home Gesture Recognition Using Wireless Signals," Proceedings of the 19th Annual International Conference on Mobile Computing & Networking, MOBICOM '13, pp. 27-38, Jan. 2013.
Joshi et al., "WiDeo: Fine-grained Device-free Motion Tracing using RF Backscatter," 12th Usenix Symposium on Networked Systems Design and Implementation (NSDI'15), pp. 189-204, May 4, 2015.
Daniels et al., "Forward Collision Vehicular Radar With IEEE 802.11: Feasibility Demonstration Through Measurements," IEEE Transactions on Vehicular Technology, vol. 67, No. 2, pp. 1404-1416, Feb. 1, 2018.
EP Application # 19854164.1 Search Report dated May 9, 2022.
EP Application # 19854164.1 Office Action dated Dec. 12, 2024.
International Application # PCT/IB2019/061355 search report dated Mar. 18, 2020.
International Application # PCT/IB2019/061374 search report dated Apr. 27, 2020.
Banin et al., "Reference Positioning Engine & Measurements Database for Wi-Fi RTT (FTM) Positioning", Intel Corporation, pp. 1-13, Aug. 1, 2018.
Gunther et al., "Measuring Round Trip Times to Determine the Distance between WLAN Nodes", International Conference on Research in Networking, pp. 768-779 , May 2, 2005.
Chen et al., "Doppler Based Detection of Multiple Targets in Passive Wi-Fi Radar Using Underdetermined Blind Source Separation", International Conference on Radar (RADAR), pp. 1-6, Aug. 27, 2018.
Chabriel et al., "Passive Covert Radars using CP-OFDM signals. A new efficient method to extract targets echoes", International Conference on Radar (RADAR), pp. 1-6, Oct. 13, 2014.
Huang et al., "Feasibility and Limits of Wi-Fi Imaging", SenSys '14: Proceedings of the 12th ACM Conference on Embedded Network Sensor System, pp. 266-279, Nov. 3, 2014.
U.S. Appl. No. 16/550,232 Office Action dated Nov. 4, 2020.
IEEE P802.11ax™/D2.3, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, IEEE Computer Society, pp. 1-660, Apr. 2018.
Rs et al., "Design of Inverse Moving Target Indicator (IMTI) algorithm for arbitrary filter weights", 9th International Radar Symposium India—(IRSI—13), pp. 1-4, Dec. 10-14, 2013.
Gurbuz et al., "Radar Detection and Identification of human Signatures using Moving Platforms", Thesis in partial fulfillment of the requirements for the Degree Doctor of Philosophy of Philosophy in the School of Electrical and Computer Engineering, Georgia Institute of Technology, pp. 1-127, Dec. 2009.
Sit, "MIMO OFDM Radar-Communication System with Mutual Interference Cancellation", KIT Scientific Publishing, pp. 1-262, year 2017.
Kim et al., "Human Detection and Activity Classification Based on Micro-Doppler Signatures Using Deep Convolutional Neural Networks", IEEE Geoscience and Remote Sensing Letters, vol. 13, No. 1, pp. 8-12, Jan. 2016.
Cao, "A CFAR Algorithm for Radar Detection Under Severe Interference", Proceedings of the 2004 Intelligent Sensors, Sensor Networks and Information Processing Conference, pp. 167-172, Dec. 14-17, 2004.
Scharf et al., U.S. Appl. No. 16/550,232, filed Aug. 25, 2019.
International Application # PCT/IB2019/057132 search report dated Dec. 4, 2019.
Yokev et al., U.S. Appl. No. 16/726,986, filed Dec. 26, 2019.

* cited by examiner

POSITIONING SYSTEM BASED ON DISTRIBUTED TRANSMISSION AND RECEPTION OF WI-FI SIGNALS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Provisional Patent Application 62/787,310, filed Jan. 1, 2019, whose disclosure is incorporated herein by reference.

TECHNICAL FIELD

Embodiments described herein relate generally to wireless networks, and particularly to systems and methods for wireless positioning within a wireless network environment.

BACKGROUND

Techniques that utilize wireless communication signals to perform indoor positioning based on wireless signals were previously proposed in the patent literature. For example, U.S. Patent Application Publication 2017/0212210 describes a time-reversal positioning system includes a storage storing first data representing channel impulse responses derived from probe signals sent from a plurality of positions and second data representing coordinates of the positions. A data processor determines a position of a terminal device based on the stored channel impulse responses and a time-reversed signal determined based on a time-reversed version of a channel impulse response that is estimated based on a channel probing signal sent from the terminal device.

As another example, U.S. Pat. No. 10,031,209 describe a method in which a first distance between a first node and a target node is computed based on a first time-of-flight (ToF) of a communication sequence between the first node and the target node. A second distance between a second node and the target node is computed based on a second ToF of the communication sequence between the first node and the target node, as recorded by the second node. A location of the target node is determined based on the first distance and the second distance.

PCT patent application Publication WO2016/065368 describes systems and methods for determining a location of user equipment (UE) in a wireless system can comprise receiving reference signals via a location management unit (LMU) having two or more co-located channels, wherein the two or more co-located channels are tightly synchronized with each other and utilizing the received reference signals to calculate a location of the UE. Some systems may include multichannel synchronization with a standard deviation of less than or equal 10 ns. Some systems may include two LMUs, with each LMU having internal synchronization, or one LMU with tightly synchronized signals.

SUMMARY

An embodiment of the present invention includes a method for estimating a location of a target Wireless Local- Area Network (WLAN) device, the method including obtaining relative locations of three or more WLAN devices. Respective distances are measured between each of the WLAN devices and the target WLAN device. The location of the target WLAN device is estimated based on the locations of the WLAN devices and on the distances between the WLAN devices and the target WLAN device, wherein measuring a distance between a WLAN device and the target WLAN device includes (a) sending a first WLAN signal by a transmitter of the WLAN device and detecting a first leakage signal by a receiver of the WLAN device, (b) detecting the first WLAN signal by a receiver of the target WLAN device and responsively sending a second WLAN signal by a transmitter of the target WLAN device, and detecting a second leakage signal by the receiver of the target WLAN device, (c) detecting the second sent WLAN signal by the receiver of the WLAN device, (d) calculating a first time difference between a time the second WLAN signal was sent and a time the first leakage signal was detected, (e) calculating a second time difference between a time the first WLAN signal was sent and a time the second leakage signal was detected, and (f) subtracting the second time difference from the first time difference to obtain a time-of-flight that corresponds to the distance between the WLAN device and the target WLAN device.

In some embodiments, obtaining the relative locations of the three or more WLAN devices includes (a) obtaining distances among the three or more WLAN devices (b) calculating the relative locations based on the relative distances among the three or more WLAN devices.

In some embodiments, obtaining the distances among the three or more WLAN devices includes calculating each distance, between a first WLAN device and a second WLAN device, by (i) sending a first WLAN signal by a transmitter of the first WLAN device and detecting a first leakage signal by a receiver of the first WLAN device, (ii) detecting the first WLAN signal by a receiver of the second WLAN device and responsively sending a second WLAN signal by a transmitter of the second WLAN device, and detecting a second leakage signal by the receiver of the second WLAN device, (iii) detecting the second sent WLAN signal by the receiver of the first WLAN device, (iv) calculating a first time difference between a time the second WLAN signal was sent and a time the first leakage signal was detected, (v) calculating a second time difference between a time the first WLAN signal was sent and a time the second leakage signal was detected, and (vi) subtracting the second time difference from the first time difference to obtain a time-of-flight that corresponds to the distance between the first WLAN device and the second WLAN device.

In an embodiment, estimating the location of the target WLAN device further includes: (a) detecting, by at least one of the three or more WLAN devices that is further configured as a Wi-Fi radar, a radar-derived location of a user of the target WLAN device, and (b) corroborating the radar-derived location of the user with the location measured using the three or more WLAN devices.

In other embodiments, the three or more WLAN devices are an access point and two repeaters, or three repeaters.

There is additionally provided, in accordance with another embodiment of the present invention, a method for calculating a distance between first and second Wireless Local-Area Network (WLAN) devices, the method including sending a first WLAN signal by a transmitter of the first WLAN device and detecting a first leakage signal by a receiver of the first WLAN device. The first WLAN signal is detected by a receiver of the second WLAN device and responsively a second WLAN signal is sent by a transmitter of the second WLAN device, and a second leakage signal is detected by the receiver of the second WLAN device. The second sent WLAN signal is detected by the receiver of the first WLAN device. A first time difference is calculated between a time the second WLAN signal was sent and a time the first leakage signal was detected. A second time difference is calculated between a time the first WLAN signal was sent and a time the second leakage signal was detected. The second time difference is subtracted from the first time difference to obtain a time-of-flight that corresponds to the distance between the first WLAN device and the second WLAN device.

There is further provided, in accordance with another embodiment of the present invention, an apparatus for estimating a location of a target Wireless Local-Area Network (WLAN) device, the apparatus including three or more WLAN devices which are configured to obtain their relative locations, wherein each of the WLAN devices is further configured to measure a respective distance between the WLAN device and the target WLAN device, so as to estimate the location of the target WLAN device based on the locations of the WLAN devices and on the distances between the WLAN devices and the target WLAN device, wherein each of the WLAN devices is configured to measure a distance between the WLAN device and the target WLAN device by: (i) sending a first WLAN signal by a transmitter of the WLAN device and detecting a first leakage signal by a receiver of the WLAN device, (ii) detecting the first WLAN signal by a receiver of the target WLAN device and responsively sending a second WLAN signal by a transmitter of the target WLAN device, and detecting a second leakage signal by the receiver of the target WLAN device, (iii) detecting the second sent WLAN signal by the receiver of the WLAN device, (iv) calculating in a processor a first time difference between a time the second WLAN signal was sent and a time the first leakage signal was detected, (v) calculating a second time difference between a time the first WLAN signal was sent and a time the second leakage signal was detected, and (vi) subtracting the second time difference from the first time difference to obtain a time-of-flight that corresponds to the distance between the WLAN device and the target WLAN device.

These and other embodiments will be more fully understood from the following detailed description of the embodiments thereof, taken together with the drawings in which:

DETAILED DESCRIPTION OF EMBODIMENTS

Overview

Figure 1:
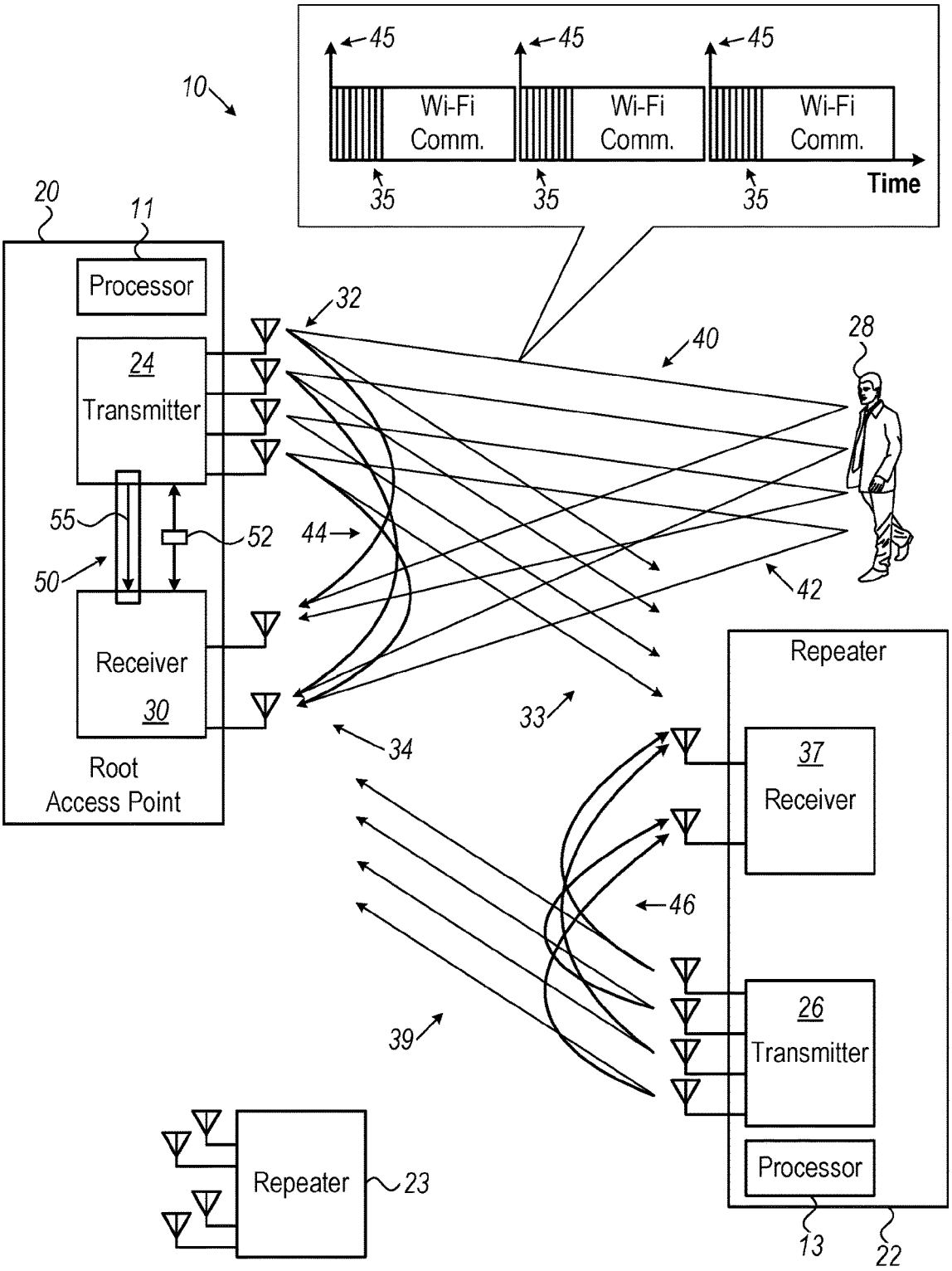
FIG. 1 is a block diagram that schematically illustrates a Wi-Fi positioning system that is further configured as a Wi-Fi radar, in accordance with an embodiment that is described herein.

Indoor positioning using Wi-Fi signals may be used for various applications, such as optimizing a deployment of multiple access points (APs), and to analyze occupancy and traffic volume of humans carrying Wi-Fi enabled personal devices, such as smartphones. Such Wi-Fi enabled devices are also called hereinafter "target Wireless Local-Area Network (WLAN) devices."

However, Wi-Fi based positioning solutions, which use measured time-of-flight signals between WLAN transmitters and receivers, have limited accuracy. The inaccuracy may result from, for example, delays related to how the AP functions, such as between a time of request to send a packet and the actual time the packet is sent, and/or between actual time of arrival of the packet and the time its detection is registered in the receiver.

An AP is a device that creates a WLAN in a designated area, such as inside a building. An AP typically transmits and receives wireless communication signals to and from WLAN stations (e.g., smartphones and laptops) in the designated area. A common communication standard in use with APs is the IEEE 802.11 standard family for Wi-Fi communication using ultra-high radio frequencies, typically between 1 GHz and 10 GHz.

Embodiments of the present invention that are described hereinafter provide techniques for WLAN systems comprising two or more WLAN devices (e.g., an AP and a repeater) which, using the disclosed techniques on top of their standard use in communication, can measure a distance between the WLAN devices, with highly accurate results, by automatically cancelling the aforementioned delays existing with nominally functioning WLAN devices.

Some embodiments of the present invention provide methods of use and systems comprising three or more WLAN devices which, on top of their standard use, function as (a) accurate Wi-Fi positioning systems of Wi-Fi enabled devices, and optionally (b) a Wi-Fi radar to detect location and movements of physical objects, such as a human subject. Use (b) is also called hereinafter "detecting a radar-derived location of a user of the target WLAN device."

The disclosed systems can perform either positioning or radar sensing within a designated area (i.e., in the surroundings of the three or more WLAN devices). In some embodiments, the system performs both positioning and radar sensing, in order to, for example, improve positioning reliability of moving targets, such as humans, who carry a Wi-Fi enabled device. Such positioning, which is corroborated using two different methods, may improve robustness in challenging positioning applications.

In some embodiments of the present invention, both the transmitter and the receiver of an AP and a repeater of the system utilize a same Wi-Fi channel, whereby the receiver of an AP is able to receive both the AP's (or the repeater's) own transmitter packets and packets from a Wi-Fi enabled device (e.g., from a station (STA) or a from a smartphone), and compare the time differences between receptions with high accuracy as part of a disclosed high-accuracy positioning method. Furthermore, the transmitter and the receiver operate in parallel, and by removing the need to switch between transmission and reception phases (e.g., states), the AP (or the repeater) can perform positioning measurements at higher rates.

For the disclosed positioning techniques, there is no need for timing synchronization between the transmitter and the receiver of the AP or the repeater. Nor is clock synchronization between transmitter and receiver of the AP or the repeater mandatory, though it may improve positioning accuracy. Typically, the disclosed positioning technique uses fine timing measurement (FTM) packets, but other packet types can be used as well. In some embodiments, the AP used is radar-sensing capable, and which includes timing and clock synchronization, as described below. Such an AP that uses WLAN packets for radar sensing is described in U.S. patent application Ser. No. 16/550,232, filed Aug. 25, 2019, entitled "Wi-Fi Radar Sensing," which is assigned to the assignee of the present patent application and whose disclosure is incorporated herein by reference.

In radar mode, the disclosed AP device transmits sequences of Wi-Fi channel-sounding packets, e.g., Null Data Packets (NDPs) such as 802.11AX NDP packets, and receives respective sequences of NDPs, also named hereinafter "echoes," that are physically reflected or scattered by objects in the designated area. The embodiments described herein refer mainly to NDPs by way of example. Generally, however, any other suitable type of WLAN packet, channel-sounding packets or otherwise, can be used for radar processing.

To estimate a range (i.e., a distance) from the AP to a target that causes the echoes, the disclosed AP in use includes synchronization circuitries, so that the same AP device that makes the transmission can analyze the synchronously received echo signals in order to detect moving targets by detecting Doppler shifts.

To measure the very low Doppler shifts, carrier frequency drift and/or jitter between the transmit and receive circuitries of the radar-sensing capable AP are zeroed by driving an RF transmit circuitry and an RF receive circuitry of the AP with an identical RF clock signal.

Typically, each of the disclosed systems comprises a root AP and one or more repeaters. In some embodiments, the processor in the root AP is programmed in software containing a particular algorithm that enables the processor to conduct each of the processor-related steps and functions outlined above. In general, however, any processor can be used for conduct each of the processor-related steps and functions outlined herein, including, by way of example, any of the processors comprised in any of the WLAN devices, or a remote processor (e.g., a cloud processor).

The disclosed techniques provide accurate positioning capabilities to APs using WLAN signals, which may be applied as a standalone solution or in combination with Wi-Fi radar sensing.

System Description

FIG. 1 is a block diagram that schematically illustrates a Wi-Fi positioning system 10 that is further configured as a Wi-Fi radar, in accordance with an embodiment that is described herein. System 10 comprises a root wireless communication access point (AP) 20 that is further configured as a Wi-Fi radar. In the present example, AP 20 operates in accordance with an IEEE Standard of the 802.11 family. In the shown embodiment, root AP 20 communicates with a repeater 22, but in general root AP 20 communicates with two or more repeaters, such as with a repeater 23 of system 10, as described below. Repeater 22 has transmission and reception capabilities but lacks dedicated radar-sensing capabilities.

AP 20 comprises one or more transmit antennas 32 and one or more receive antennas 34. The transmit antennas and receive antennas may be the same, or different, antennas. Antennas 32 transmit transmission beams 33 (and the transmit antennas of repeater 22 transmit transmission beams 39) that are directed toward the repeater(s) (and back to the root AP).

In the uplink direction, AP 20 receives, via antennas 32 in a WLAN receiver 30, uplink transmissions (not shown) from one or more repeaters, such as repeater 22, and extracts information sent to AP 20 from repeater(s) (in case of repeater 22, sent (39) by a transmitter 26 after receiver 37 of repeater 22 receives signals from AP 20).

The disclosed layout is capable of performing the disclosed distance measurement protocol that begins when root AP 20 transmitter 24 sends a packet that triggers the measurement sequence. When repeater 22 receiver 37 receives the trigger packet, repeater 22 returns transmission. The distance measurement sequence includes:

- Each of the devices (root AP and repeater) start sending packets to each other.
- Both devices detect their own packets (e.g., leakage packets 44 and 46) and the other AP packets.
- Each device then calculates (e.g., using processors 11 and 13) the time difference between a time it detects its packet and a time it detects a packet sent by the other device.
- Both devices share their measurements and timers.
- A processor subtracts one device related time difference from the second device related time difference, divides the result by 2 (resulting in the time of flight from one device to the other), and multiplies by the speed of light to obtain the distance between the devices (e.g., between an AP and a repeater).

Figure 2:
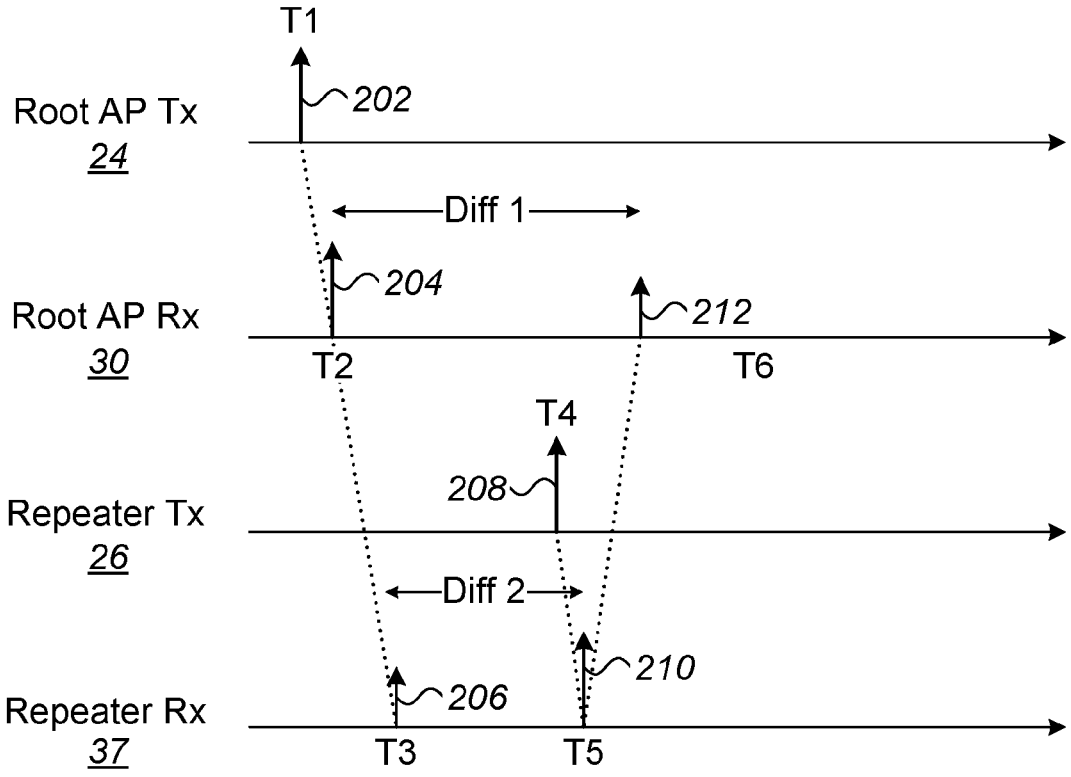
FIG. 2 is a graph that schematically illustrates a method to derive a distance between two WLAN devices of the Wi-Fi positioning system of FIG. 1, in accordance with an embodiment that is described herein.

The sequence is described in detail in FIG. 2. The measured distance is subsequently used for accurate positioning of Wi-Fi enabled devices, as described in FIG. 4.

After running this sequence several times, removing problematic results, and averaging the remaining results, the distance provided gives an accuracy of up to several centimeters (cm).

Subtracting the longest time difference measured by the two WLAN devices with the time it takes the packet yields the clock difference between devices. Clock synchronization is required, for example, in real time Audio/Video applications.

In radar mode of root AP 20, WLAN receiver 30 receives echoes 42 of transmission beams 40, also termed hereinafter "echo taps." An echo tap has a time delay due to the accumulated propagation duration of beam 40 to human 28 and of its echo 42 back to the receiver. In order to perform Wi-Fi radar detection, WLAN transmitter 24 and WLAN receiver 30 are synchronized in time by a timing-synchronization signal: at the beginning of each transmission of an NDP sequence 35 (seen in inset 25), WLAN transmitter 24 sends a timing-synchronization signal 45 to WLAN receiver 30 of AP 20. The timing-synchronization signal is applied by a synchronization circuitry 50 over an electrical interface 55.

As further seen in an inset 25, NDP sequences 35 are sent by WLAN transmitter 30 only when allowed by the regular communication stream load, i.e., sent between sequences carrying WLAN communication. In an embodiment, the WLAN transmitter is configured to transmit the communication packets interleaved between the channel-sounding packets, and the WLAN receiver is configured to receive WLAN communication packets from one or more WLAN stations (STAs) interleaved between the echo packets.

WLAN transmitter 24 of root AP 20 transmits NDP sequences 35 without beamforming for the purpose of channel estimation, and therefore NDP sequences 35 are transmitted more or less omnidirectionally. NDP sequences 35 and the respective sequences of echoes (not shown) are analyzed by a processor 11 of AP 20 to perform radar detection of a human 28.

Using channel impulse response (CIR) characterization, a delay between a timing of a measured leakage tap 44 and a measured echo tap produced by human is used by processor 11 to estimate the distance of human 28 from AP 20. The ability of AP 20 to detect and analyze echo 42 is a prerequisite for estimating a range to human 28, and it depends on the capability of AP 20 to identify micro-Doppler signatures of human 28.

As noted above, detection of micro-Doppler shifts requires zero drift and/or jitter between RF carrier frequencies of WLAN transmitter 24 and WLAN receiver 30. The zero drift and/or jitter in an RF frequency is achieved using a single RF carrier frequency source, embodied by a circuitry 52, that simultaneously drives the two circuitries with synchronized RF clock signals. Typically, circuitry 52 is realized using a single Voltage-Controlled Crystal Oscillator (VCXO) local oscillator (LO).

In some embodiments, WLAN receiver 30 estimates a Multiple-Input Multiple-Output (MIMO) N×N (e.g., 4×4=16 elements) channel configuration between a set of transmit and receive antennas of AP 20. The MIMO is used to estimate direction and also to improve angular resolving power to separate between targets. The MIMO is also used to improve the tracking estimation of a target object and its Doppler shift estimate. Using MIMO gives an effect of SNR enhancement.

In some embodiments, some of the functions of the APs, e.g., some or all of the functions of processors 11 and/or 13, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. In particular, processor 11 runs a dedicated algorithm as disclosed herein, including in FIGS. 2, 4, and 5, that enables processor 11 to perform the disclosed steps, as further described below.

Improved Distance Measurements

FIG. 2 is a graph that schematically illustrates a method to derive a distance between two WLAN devices of Wi-Fi positioning system 10 of FIG. 1, in accordance with an embodiment that is described herein. The initial output of the disclosed technique is a net time of flight between root AP 20 to repeater 22, i.e., after all internal latencies (i.e., device related delays) are taken into account, as described below. The time of flight is converted to distance, which by this method is derived to an accuracy of several centimeters, by multiplying it by the speed of light.

The same method can be applied to obtain the distance between AP 20 and repeater 23, and the distance between repeater 22 and repeater 23, which are required for system 10 to position a Wi-Fi enabled device, as described in FIG. 4.

The disclosed derivation of the distance between root AP 20 and repeater 22 begins with transmitter 24 of root AP 20 sending (202) at a time T1 a packet that triggers the measurement sequence. Root receiver 30 detects (204) AP 20's own transmission (i.e., a leakage packet 44) at a time T2. When repeater 22 receiver 37 detects (206) the sent packet at a time T3, repeater 22 starts transmitting (208) at T4, e.g., after an unknown delay, a sequence from its side. Repeater 22 receiver 37 detects (210) its own transmission (i.e., a leakage packet 46) at a time T5. At a time T6, root receiver detects (212) the packet sent by repeater 22 responsively to root AP 20's own transmission, completing the round trip of the packets.

Each WLAN device (i.e., AP 20 and repeater 22) then calculates (e.g., using processors 11 and 13) the time difference between arrival of the leakage packet and the respective packet sent by the other WLAN device, i.e., times (T2−T1) and (T5−T4). Each WLAN device also records the time of transmission for its packet (i.e., times T1 and T4) and both WLAN devices share their measurements and timers.

Subtracting one WLAN device time difference from the second WLAN device time difference and dividing by 2 gives the time it takes for one packet to go from one transmitter to the other (T3−T2), i.e., of the net time of flight from root AP 20 to repeater 22:

$$(T3-T2)=(T6-T5)=((T6-T2)-(T5-T3))/2=(Diff1-Diff2)/2.$$

The distance between AP20 and repeater 22 is given by:

$$Distance_AP20_REPEATER_22=(Diff1-Diff2)\cdot c/2$$

where c is the speed of light.

Another useful result of the above calculation is the time offset between root AP 20 clock to repeater 22 clock, Δ_clock:

$$\Delta_clock=(T6-T2)=Diff1.$$

Simultaneous Wi-Fi Positioning and Wi-Fi Radar Sensing

Figure 3:
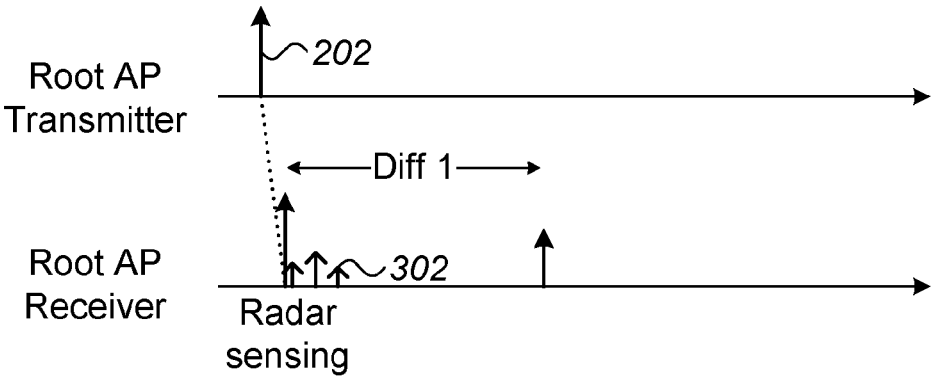
FIG. 3 is a graph that schematically shows combined Wi-Fi positioning and radar sensing by the Wi-Fi positioning system of FIG. 1, in accordance with an embodiment that is described herein.

FIG. 3 is a graph that schematically shows combined Wi-Fi positioning and radar sensing by the Wi-Fi positioning system 10 of FIG. 1, in accordance with an embodiment that is described herein. Using substantially the same time windows for the two applications saves air time and corroborates positioning of humans carrying Wi-Fi enabled devices, obtained by the Wi-Fi positioning method described in FIG. 4, in dense physical and communication environments.

As seen in FIG. 3, almost immediately after receiving (204) leakage packets, the root receiver receives (302) echo packets, which were reflected from targets, such as moving humans. Using the echo packets and analysis of micro Doppler signatures, AP 20 identifies range and direction to moving targets, as described in the aforementioned U.S. patent application Ser. No. 16/550,232. If the same humans are carrying a Wi-Fi enabled device, AP 20 may tag these as a corroborated detection (achieved using the two independent detection methods).

In FIG. 3, radar sensing is performed using the same packets transmitted for the distance measurements. However, dedicated packets may be sent by AP 20 for radar sensing use only.

Improved Positioning of Wi-Fi Enabled User Devices

Figure 4A:
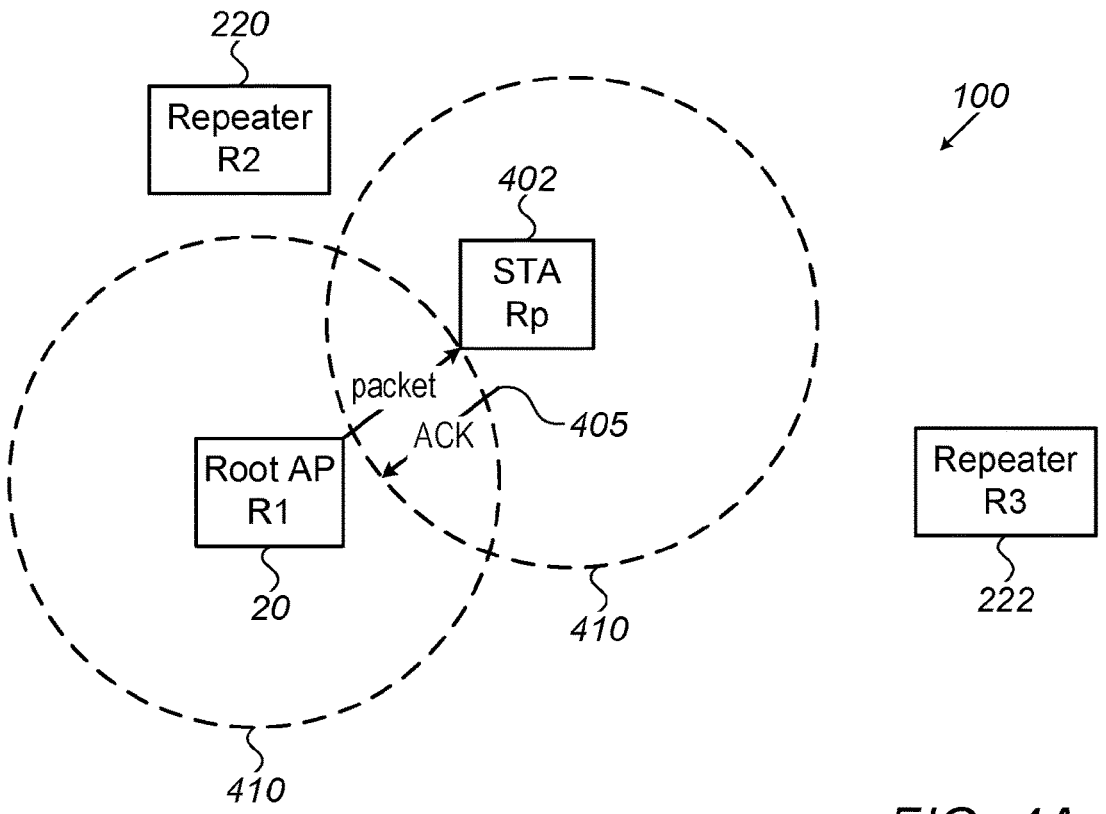
FIGS. 4A and 4B are drawings that describe positioning of a Wi-Fi enabled device by the Wi-Fi positioning system of FIG. 1, in accordance with an embodiment that is described herein.
Figure 4B:
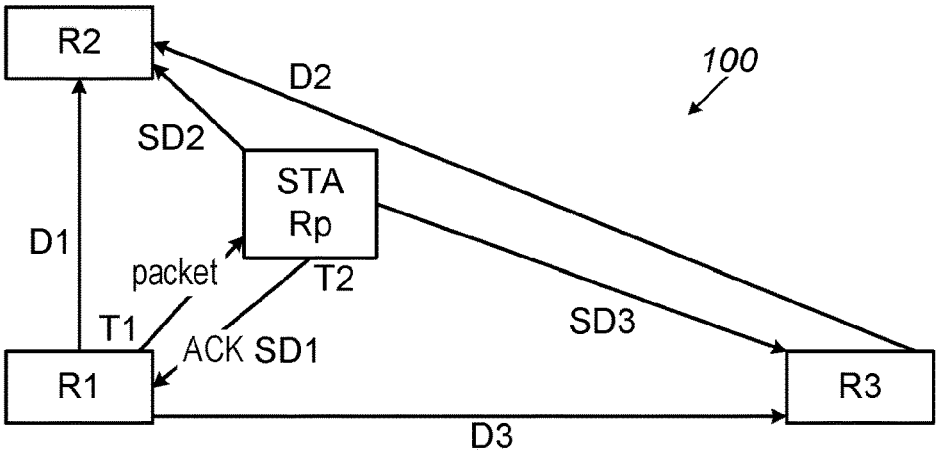

FIGS. 4A and 4B are drawings that describe positioning of a Wi-Fi enabled device by Wi-Fi positioning system 10 of FIG. 1, in accordance with an embodiment that is described herein. As seen in FIG. 4A, a Wi-Fi enabled device STA 402 is located within the environment of system 10, and its position, which may change in time, is measured by system 10 as described below.

STA 402 is also commonly referred to as a "user device" or a "client device." While the description in FIG. 4 is of positioning a station (STA), such as a laptop, in general any user device that is Wi-Fi enabled, such as a smartphone, may be positioned using the same description.

As further seen in FIG. 4A, in addition to bidirectional communication between WLAN devices of system 10, root AP 20 transmission is acknowledged (ACK) by a return transmission (405) from STA 402. Circles 410 each define a radius relative to the position of each of the devices (i.e., on AP, two repeaters and the STA) which are used in FIG. 4B in the triangulation of the position of STA 402.

To measure the position of STA 402, Rp, relative to the positions of the WLAN devices, the relative position coordinates R1, R2, and R3 must first be found. The three positions define vertices of the triangle. To that end, AP 20, repeater 22, and repeater 23 are applied in pairs to find, using the method described in FIG. 2, the AP-repeater distances R1-R2 and R1-R3, repeater-repeater and distance R2-R3 (i.e., three edges of the triangle).

Using the distance measurement technique described in FIG. 2, the following distances (edges of the triangle) are known accurately:

D1: the distance between R1 and R2

D2: the distance between R2 and R3

D3: the distance between R1 and R3

Finding R1, R2, and R3 from D1, D2, and D3 can be done, for example, by triangulation methods. 4D mapping is also possible with ≥4 WLAN devices, using Simultaneous Localization and Mapping (SLAM) methods. To find D2 using the method of FIG. 2, one of repeaters 22 and 23 is considered a root and the other a repeater.

A positioning protocol of STA 402 thus takes the following steps:

The root AP sends STA 402 a short packet, which causes STA 402 to send an ACK packet in return.

The repeaters receive both packets sent by the root AP and the packet sent in reply by STA 402 and measure the time difference between them.

Using all time differences between these packets from all WLAN devices, it is possible to locate the STA position relative to the triangle defined by R1, R2, and R3. Put formally, as described below, the following unknown has to be found to provide the position of STA 402, Rp:

SD1: the time of flight of a signal from Rp to R1

SD2: the time of flight of a signal from Rp to R2

SD3: the time of flight of a signal from Rp to R3

As seen in FIG. 4B, root AP 20 sends a packet to STA 402 at a time T1, and responsively, STA 402 sends a reply packet root AP 20 to at a time T2, which are known times.

System 100 can then measure the following times for each WLAN device:

A time difference R1_diff between transmission time T1 and a reception of ACK packet form STA 402 at root AP 20:

R1_diff=(T2+SD1)−T1, which yields SD1.

A time difference R2_diff between transmission time T1 and a reception of ACK packet from STA 402 at repeater 220:

R2_diff=(T2+SD2)−(T1+D1/c), which yields SD2.

A time difference R3_diff between transmission time T1 and a reception of ACK packet form STA 402 at repeater 222:

R3_diff=(T2+SD3)−(T1+D3/c), which yields SD3.

Two sets of possible coordinates (xo,yo) of position Rp of STA 402 are then readily found from SD1 and SD2, or SD1 and SD3, using triangulation, by solving, for example, using processor 11 of root AP 20, a two-circle set of equations, $((x-xo)^2+(y-yo)^2)-r_j^2=0$, j=1,2, using for $r_j$ pair radiuses (SD1·c, SD2·c), or (SD1·c, SD3·c). In each case the radius not used in the circle equations (e.g., $r_3$ or $r_2$, respectively) enables the selection of the correct solution for Rp.

Improved Fine Timing Measurement (FTM) Protocol

Fine timing measurement (FTM) is a Wi-Fi protocol used to measure distance between any pair of Wi-Fi enabled devices (e.g., between an AP and an STA). Since the protocol uses transmission time stamps in order to calculate a round trip delay between any device pair, any inaccuracy in time measurement causes an inaccuracy in the distance measurement.

Also, delays between registered and actual communication times by transmitter and receiver components adds uncertainty and inherent delays in the FTM protocol.

The disclosed embodiment uses only receiver measurements in which delays are automatically canceled due to both Wi-Fi enabled devices (e.g., between an AP and an STA) cause and remove the same delays over the round trip of data.

Figure 5:
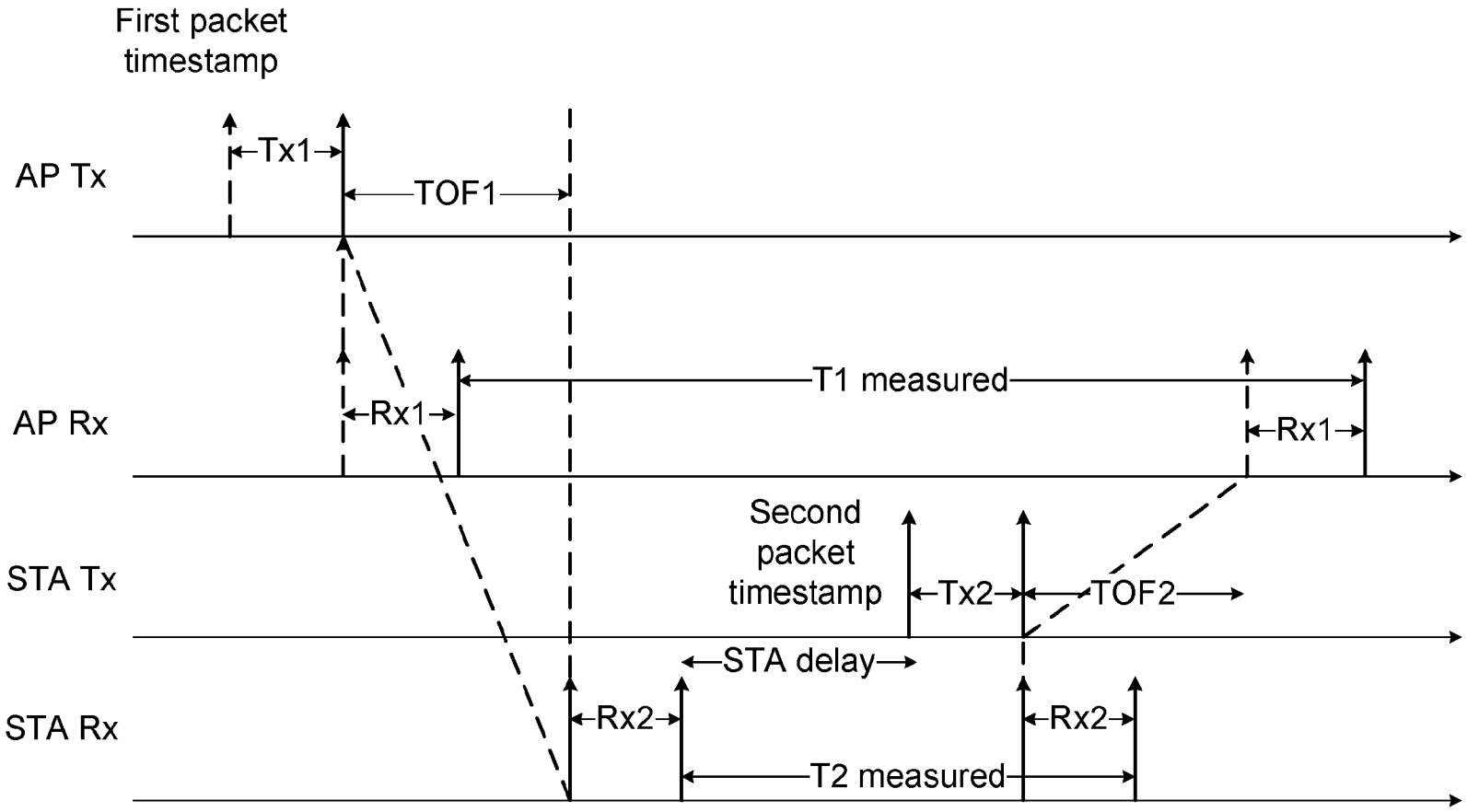
FIG. 5 is a graph that schematically illustrates a method to perform a fine timing measurement (FTM) using the Wi-Fi positioning method of FIG. 2, in accordance with an embodiment that is described herein.

FIG. 5 is a graph that schematically illustrates a method to perform a fine timing measurement (FTM) using the Wi-Fi positioning method of FIG. 2, in accordance with an embodiment that is described herein.

The times used in FIG. 5 are:

TOF1: actual time of flight from the AP to the STA

TOF2: actual time of flight from the STA to the AP

Tx1: the time it takes for the AP to actually transmit

Rx1: the time it takes for the AP to actually receive

Tx2: the time it takes for STA to actually transmit

Rx2: the time it takes for the STA to actually receive

STA delay: the time it takes to the STA from receiving a packet till transmitting an ACK T1 measured: the round-trip time difference the AP measures between sent and received packets T2 measured: the round-trip time difference the STA measures between received and sent packets.

Using the disclosed receiver Rx readings:

T1 measured=TOF1−Rx1+Rx2+STA delay+Tx2+TOF2+Rx1

T2 measured=STA delay+Tx2+Rx2

T1 measured−T2 measured=TOF1+TOF2

Finally, the exact distance the disclosed improved FTM protocol yields is received by:

FTM_distance=((T1 measured−T2 measured)/2)·c.

Although the embodiments described herein mainly address Wi-Fi positioning systems, the methods and systems described herein can also be used in other applications, such as in robot positioning systems.

It will be thus appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for estimating a location of a target Wireless Local-Area Network (WLAN) device, the method comprising:

obtaining relative distances among three or more WLAN devices, and obtaining relative locations of the three or more WLAN devices based on the relative distances;

measuring respective distances between each of the WLAN devices and the target WLAN device; and estimating the location of the target WLAN device based on the locations of the WLAN devices and on the distances between the WLAN devices and the target WLAN device, wherein measuring a distance between a WLAN device and the target WLAN device comprises:

sending a first WLAN signal by a transmitter of the WLAN device and detecting a first leakage signal by a receiver of the WLAN device;

detecting the first WLAN signal by a receiver of the target WLAN device and responsively sending a second WLAN signal by a transmitter of the target WLAN device, and detecting a second leakage signal by the receiver of the target WLAN device;

detecting the second sent WLAN signal by the receiver of the WLAN device;

calculating a first time difference between a time the second WLAN signal was sent *or detected* and a time the first leakage signal was detected;

calculating a second time difference between a time the first WLAN signal was sent *or detected* and a time the second leakage signal was detected; and subtracting the second time difference from the first time difference to obtain a time-of-flight that corresponds to the distance between the WLAN device and the target WLAN device, and wherein obtaining the distances among the three or more WLAN devices comprises calculating each distance, between a first WLAN device and a second WLAN device, by:

sending a [first] *third* WLAN signal by a transmitter of the first WLAN device and detecting a [first] *third* leakage signal by a receiver of the first WLAN device;

detecting the [first] *third* WLAN signal by a receiver of the second WLAN device and responsively sending a [second] *fourth* WLAN signal by a transmitter of the second WLAN device, and detecting a [second] *fourth* leakage signal by the receiver of the second WLAN device;

detecting the [second] *fourth* sent WLAN signal by the receiver of the first WLAN device;

calculating a [first] *third* time difference between a time the [second] *fourth* WLAN signal was sent *or detected* and a time the [first] *third* leakage signal was detected;

calculating a [second] *fourth* time difference between a time the [first] *third* WLAN signal was sent *or detected* and a time the [second] *fourth* leakage signal was detected; and subtracting the [second] *fourth* time difference from the [first] *third* time difference to obtain a time-of-flight that corresponds to the distance between the first WLAN device and the second WLAN device.

2. The method according to claim 1, wherein estimating the location of the target WLAN device further comprises:

detecting, by at least one of the three or more WLAN devices that is further configured as a Wi-Fi radar, a radar-derived location of a user of the target WLAN device; and corroborating the radar-derived location of the user with the location measured using the three or more WLAN devices.

3. The method according to claim 1, wherein the three or more WLAN devices are an access point and two repeaters, or three repeaters.

4. An apparatus for estimating a location of a target Wireless Local-Area Network (WLAN) device, the apparatus comprising:

three or more WLAN devices which are configured to obtain relative locations between one another by (a) obtaining distances among the three or more WLAN devices (b) calculating the relative locations based on the relative distances among the three or more WLAN devices, wherein each of the WLAN devices is further configured to measure a respective distance between the WLAN device and the target WLAN device, so as to estimate the location of the target WLAN device based on the locations of the WLAN devices and on the distances between the WLAN devices and the target WLAN device, wherein each of the WLAN devices is configured to measure a distance between the WLAN device and the target WLAN device by:

sending a first WLAN signal by a transmitter of the WLAN device and detecting a first leakage signal by a receiver of the WLAN device;

detecting the first WLAN signal by a receiver of the target WLAN device and responsively sending a second WLAN signal by a transmitter of the target WLAN device, and detecting a second leakage signal by the receiver of the target WLAN device;

detecting the second sent WLAN signal by the receiver of the WLAN device;

calculating in a processor a first time difference between a time the second WLAN signal was sent *or detected* and a time the first leakage signal was detected;

calculating a second time difference between a time the first WLAN signal was sent *or detected* and a time the second leakage signal was detected; and subtracting the second time difference from the first time difference to obtain a time-of-flight that corresponds to the distance between the WLAN device and the target WLAN device, and wherein the three or more WLAN devices are configured to calculate each distance, between a first WLAN device and a second WLAN device, by:

sending a [first] *third* WLAN signal by a transmitter of the first WLAN device and detecting a [first] *third* leakage signal by a receiver of the first WLAN device;

detecting the [first] *third* WLAN signal by a receiver of the second WLAN device and responsively sending a [second] *fourth* WLAN signal by a transmitter of the second WLAN device, and detecting a [second] *fourth* leakage signal by the receiver of the second WLAN device;

detecting the [second] *fourth* sent WLAN signal by the receiver of the first WLAN device;

calculating in a processor a [first] *third* time difference between a time the [second] *fourth* WLAN signal was sent *or detected* and a time the [first] *third* leakage signal was detected;

calculating a [second] *fourth* time difference between a time the [first] *third* WLAN signal was sent *or detected* and a time the [second] *fourth* leakage signal was detected; and subtracting the [second] *fourth* time difference from the [first] *third* time difference to obtain a time-of-flight that corresponds to the distance between the first WLAN device and the second WLAN device.

5. The apparatus according to claim 4, wherein the three or more WLAN devices are further configured to estimate the location of the target WLAN device by:

detecting, by at least one of the three or more WLAN devices that is further configured as a Wi-Fi radar, a radar-derived location of a user of the target WLAN device; and corroborating the radar-derived location of the user with the location measured using the three or more WLAN devices.

6. The apparatus according to claim 4, wherein the three or more WLAN devices are an access point and two repeaters, or three repeaters.

*7. The method according to claim 1, wherein:*

*the first time difference is between the time the second WLAN signal was sent and the time the first leakage signal was detected;*

*the second time difference is between the time the first WLAN signal was sent and the time the second leakage signal was detected;*

*the third time difference is between the time the fourth WLAN signal was sent and the time the third leakage signal was detected; and*

*the fourth time difference is between the time the third WLAN signal was sent and the time the fourth leakage signal was detected.*

*8. The method according to claim 1, wherein:*

*the first time difference is between the time the second WLAN signal was detected and the time the first leakage signal was detected;*

*the second time difference is between the time the first WLAN signal was detected and the time the second leakage signal was detected;*

*the third time difference is between the time the fourth WLAN signal was detected and the time the third leakage signal was detected; and*

*the fourth time difference is between the time the third WLAN signal was detected and the time the fourth leakage signal was detected.*

*9. The apparatus according to claim 4, wherein:*

*the first time difference is between the time the second WLAN signal was sent and the time the first leakage signal was detected;*

*the second time difference is between the time the first WLAN signal was sent and the time the second leakage signal was detected;*

*the third time difference is between the time the fourth WLAN signal was sent and the time the third leakage signal was detected; and*

*the fourth time difference is between the time the third WLAN signal was sent and the time the fourth leakage signal was detected.*

*10. The apparatus according to claim 4, wherein:*

*the first time difference is between the time the second WLAN signal was detected and the time the first leakage signal was detected;*

*the second time difference is between the time the first WLAN signal was detected and the time the second leakage signal was detected;*

*the third time difference is between the time the fourth WLAN signal was detected and the time the third leakage signal was detected; and*

*the fourth time difference is between the time the third WLAN signal was detected and the time the fourth leakage signal was detected.*

* * * * *